United States Patent
Nagasaka et al.

(10) Patent No.: US 10,750,425 B2
(45) Date of Patent: Aug. 18, 2020

(54) RADIO TERMINAL

(71) Applicant: KYOCERA CORPORATION, Kyoto (JP)

(72) Inventors: Yushi Nagasaka, Yokohama (JP); Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 112 days.

(21) Appl. No.: 15/526,147

(22) PCT Filed: Nov. 10, 2015

(86) PCT No.: PCT/JP2015/081571
§ 371 (c)(1),
(2) Date: May 11, 2017

(87) PCT Pub. No.: WO2016/076304
PCT Pub. Date: May 19, 2016

(65) Prior Publication Data
US 2017/0325149 A1 Nov. 9, 2017

(30) Foreign Application Priority Data
Nov. 14, 2014 (JP) ................................. 2014-232107

(51) Int. Cl.
H04W 4/00 (2018.01)
H04W 36/36 (2009.01)
(Continued)

(52) U.S. Cl.
CPC .......... H04W 36/36 (2013.01); H04M 11/00 (2013.01); H04W 36/30 (2013.01); H04W 36/32 (2013.01);
(Continued)

(58) Field of Classification Search
CPC ...... H04W 36/32; H04W 36/14; H04W 84/12
See application file for complete search history.

(56) References Cited

U.S. PATENT DOCUMENTS

2005/0037798 A1 2/2005 Yamashita et al.
2008/0165737 A1* 7/2008 Uppala ................. H04W 36/32
370/331
(Continued)

FOREIGN PATENT DOCUMENTS

EP 2112858 A1 10/2009
JP 2004-159304 A 6/2004
(Continued)

OTHER PUBLICATIONS

International Search Report issued in PCT/JP2015/081571; dated Jan. 26, 2016.
(Continued)

Primary Examiner — Omoniyi Obayanju
(74) Attorney, Agent, or Firm — Studebaker & Brackett PC

(57) ABSTRACT

A controller 13 of a radio terminal 10 performs a first switching process of switching a standby target or a connection target from a mobile communication network to a wireless LAN. The controller 13 executes the first switching process in case that: a movement state of the radio terminal 10 is determined as a first state; and a condition for performing the first switching process is satisfied over a predetermined period. The controller 13 further executes the first switching process in case that: the movement state of the radio terminal 10 is determined as a second state; an access point 200 constituting the wireless LAN is a moving access point; and the condition for performing the first switching process is satisfied over the predetermined period.

14 Claims, 9 Drawing Sheets

(51) Int. Cl.
*H04W 48/18* (2009.01)
*H04W 48/16* (2009.01)
*H04W 84/00* (2009.01)
*H04M 11/00* (2006.01)
*H04W 36/30* (2009.01)
*H04W 36/32* (2009.01)
*H04W 36/14* (2009.01)

(52) U.S. Cl.
CPC ........... *H04W 48/16* (2013.01); *H04W 48/18* (2013.01); *H04W 84/00* (2013.01); *H04W 36/14* (2013.01)

(56) References Cited

U.S. PATENT DOCUMENTS

| | | | | |
|---|---|---|---|---|
| 2011/0096753 | A1* | 4/2011 | Abdel-Kader | H04W 24/10 370/332 |
| 2012/0264426 | A1* | 10/2012 | Kholaif | H04W 48/16 455/434 |
| 2014/0247807 | A1 | 9/2014 | Westerberg et al. | |
| 2014/0287733 | A1* | 9/2014 | Mach | H04W 52/0258 455/418 |
| 2015/0173002 | A1 | 6/2015 | Nakagawa et al. | |
| 2015/0271729 | A1* | 9/2015 | Sirotkin | H04W 48/00 370/332 |

FOREIGN PATENT DOCUMENTS

| | | |
|---|---|---|
| JP | 2013-192065 A | 9/2013 |
| JP | 2014-072700 A | 4/2014 |
| WO | 2015/175468 A1 | 11/2015 |

OTHER PUBLICATIONS

3rd Generation Partnership Project; "3rd Generation Partnership Project, Technical Specification Group Radio Access Network, Evolved Universal Terrestrial Radio Access (E-UTRA), User Equipment (UE) procedures in idle mode (Release 12)"; 3GPP TS 36.304 V12.1.0; Jun. 2014; pp. 1-35; 3GPP Organizational Partners.

Intel Corporation, "Open issues of WLAN/3GPP radio interworking", 3GPP TSG-RAN2 Meeting #87, R2-143802, Aug. 18-22, 2014, Dresden, Germany.

Ericsson, "Enhanced steering timers for WLAN/3GPP Radio interworking", 3GPP TSG-RAN WG2 Meeting #88, R2-145155, Nov. 17-21, 2014, 4 pages, San Francisco, USA.

"3GPP Standardization Trends on Integration of WLAN and 3GPP", IEICE, Sep. 23-26, 2014, 5 pages; with partial English language translation.

* cited by examiner

US 10,750,425 B2

RADIO TERMINAL

TECHNICAL FIELD

The present application relates to a radio terminal configured to perform a switching process of switching a standby target or a connection target between a mobile communication network and a wireless LAN.

BACKGROUND ART

There is proposed a switching process (network selection and traffic steering) of switching a standby target or a connection target between a mobile communication network and a wireless LAN when a coverage area of a mobile communication network represented by LTE (Long Term Evolution) and a coverage area of a wireless LAN overlap at least partially. Specifically, the switching process is executed on the basis of whether or not first information at a mobile communication network side satisfies a first condition and second information at a wireless LAN side satisfies a second condition. In particular, in case first condition and/or second condition are satisfied over a predetermined period, the above switching process is executed.

Here, the first information at the mobile communication network side is a measurement result (RSRPmeas) of a signal level of a received signal (RSRP; Reference Signal Received Power) and a measurement result (RSRQmeas) of a signal quality of a received signal (RSRQ; Reference Signal Received Quality), for example. The second information at a wireless LAN side is a channel utilization value of a wireless LAN, a backhaul value of a wireless LAN, and a signal intensity of a received signal (RSSI; Received Signal Strength Indicator), for example.

PRIOR ART DOCUMENT

Non-Patent Document

Non Patent Document 1; TS36. 304V12.1.0

SUMMARY OF THE INVENTION

A radio terminal according to a first aspect comprises a controller configured to perform a first switching process of switching a standby target or a connection target from a mobile communication network to a wireless LAN. The controller is further configured to execute the first switching process in case that: a movement state of the radio terminal is determined as a first state; and a condition for performing the first switching process is satisfied over a predetermined period. The controller is further configured to execute the first switching process in case that: the movement state of the radio terminal is determined as a second state different from the first state; an access point constituting the wireless LAN is a moving access point; and the condition for performing the first switching process is satisfied over the predetermined period.

A radio terminal according to a second aspect comprises a controller configured to perform a first switching process of switching a standby target or a connection target from a mobile communication network to a wireless LAN. The controller is further configured to execute the first switching process in a case that: a movement state of the radio terminal is determined as a first state; and a condition for performing the first switching process is satisfied over a first period. The controller is further configured to execute the first switching process in case that: the movement state of the radio terminal is determined as a second state different from the first state; and a condition for performing the first switching process is satisfied over a second period longer than the first period.

A radio terminal according to a third aspect comprises a controller configured to perform a first switching process of switching a standby target or a connection target from a mobile communication network to a wireless LAN. The controller is further configured to execute the first switching process in case that: an access point constituting the wireless LAN is a stationary access point; and a condition for performing the first switching process is satisfied over a first period. The controller is further configured to execute the first switching process in case that: the access point constituting the wireless LAN is a moving access point; and a condition for performing the first switching process is satisfied over a second period longer than the first period.

A radio terminal according to a fourth aspect comprises a controller configured to perform a second switching process of switching a standby target or a connection target from a wireless LAN to a mobile communication network. The controller is further configured to execute the second switching process in case that: an access point constituting the wireless LAN is a stationary access point; or a movement state of the radio terminal is determined as a first state; and a condition for performing the second switching process is satisfied over a third period. The controller is further configured to execute the second switching process in case that: the access point constituting the wireless LAN is a moving access point; or the movement state of the radio terminal is determined as a second state different from the first state; and a condition for performing the second switching process is satisfied over a fourth period longer than the third period.

DESCRIPTION OF THE EMBODIMENT

[Overview of the Disclosure]

Figure 1:
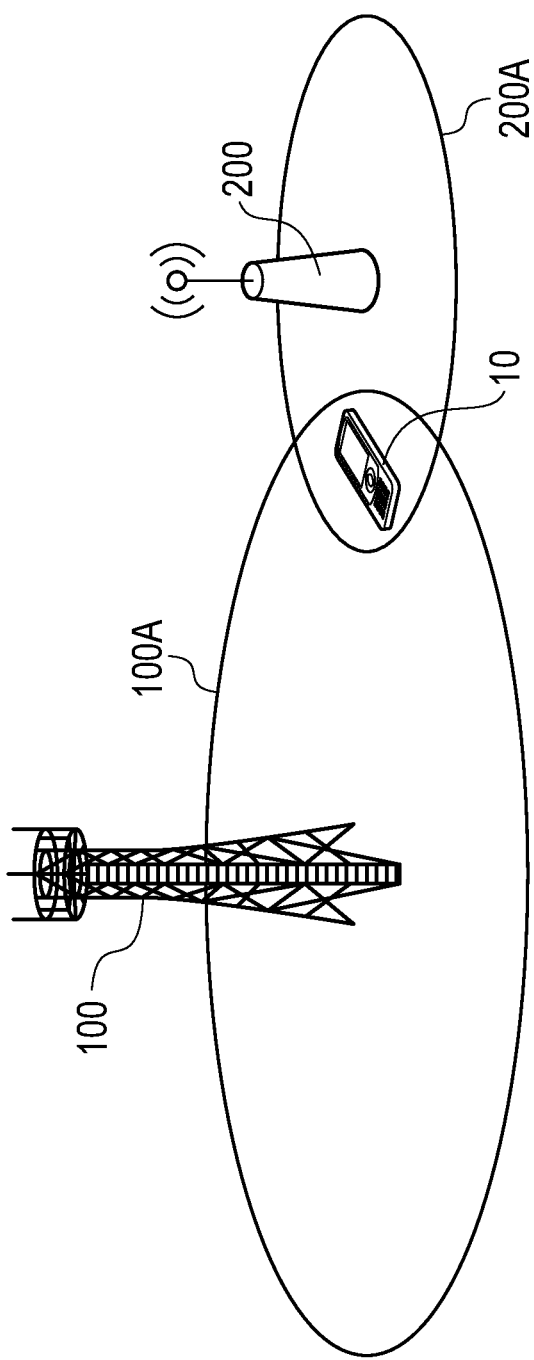
FIG. 1 is a diagram illustrating a communication system 1 according to an embodiment.

Now, when a radio terminal moves faster than a predetermined speed, there is a possibility that after a switching process from a mobile communication network to a wireless LAN is executed, a switching process from the wireless LAN to the mobile communication network is immediately executed. Therefore, when the radio terminal moves faster than the predetermined speed, it is considered that the switching process from the mobile communication network to the wireless LAN is uniformly prohibited.

However, as an access point constituting the wireless LAN, not only a stationary access point installed to a fixed object such as a store or an office, but also a moving access point installed to a moving body such as a transport is considered. Therefore, if the switching process from the mobile communication network to the wireless LAN is uniformly prohibited when the radio terminal moves faster than the predetermined speed, the radio terminal is not capable of executing the switching process from the mobile communication network to the wireless LAN in a case where the radio terminal moves together with the moving body installed with the moving access point (for example, in a case where a user possessing the radio terminal gets on a transport installed with a moving access point), and thus, it is not possible to utilize the moving access point.

Therefore, an embodiment has been made to resolve the above-described problem, and provides a radio terminal capable of effectively utilizing the moving access point.

A radio terminal according to the disclosure comprises a controller configured to perform a first switching process of switching a standby target or a connection target from a mobile communication network to a wireless LAN.

In the first aspect, the controller is further configured to execute the first switching process in case that: a movement state of the radio terminal is determined as a first state; and a condition for performing the first switching process is satisfied over a predetermined period. The controller is further configured to execute the first switching process in case that: the movement state of the radio terminal is determined as a second state different from the first state; an access point constituting the wireless LAN is a moving access point; and the condition for performing the first switching process is satisfied over the predetermined period.

According to the first aspect, even when the movement state of the radio terminal is the second state, if the access point constituting the wireless LAN is the moving access point, and further, if a condition for performing the first switching process is satisfied over the predetermined period, the controller executes the first switching process. Therefore, in the second state, the first switching process from the mobile communication network to the wireless LAN is not uniformly prohibited, and thus, it is possible to effectively utilize the moving access point.

In the second aspect, the controller is further configured to execute the first switching process in a case that: a movement state of the radio terminal is determined as a first state; and a condition for performing the first switching process is satisfied over a first period. The controller is further configured to execute the first switching process in case that: the movement state of the radio terminal is determined as a second state different from the first state; and a condition for performing the first switching process is satisfied over a second period longer than the first period.

In the second aspect, the controller is further configured to execute the first switching process in case that: an access point constituting the wireless LAN is a stationary access point; the movement state of the radio terminal is determined as the first state; and the condition for performing the first switching process is satisfied over the first period. The controller is further configured to execute the first switching process in case that: the access point constituting the wireless LAN is a moving access point; the movement state of the radio terminal is determined as the second state; and the condition for performing the first switching process is satisfied over the second period.

In the second aspect, the controller is further configured to prohibit an execution of the first switching process in case that: the access point constituting the wireless LAN is the stationary access point; and the movement state of the radio terminal is the second state.

According to the second aspect, even when the movement state of the radio terminal is the second state, if a condition for performing the first switching process is satisfied over the second period, the controller executes the first switching process. Therefore, in the second state, the first switching process from the mobile communication network to the wireless LAN is not uniformly prohibited, and thus, it is possible to effectively utilize the moving access point. In addition, the second period is longer than the first period, and thus, it is possible to reduce the possibility that the first switching process is erroneously performed in a case where the radio terminal accidentally moves in a similar way to the moving body installed with the moving access point. An example of such cases includes a case where a user possessing the radio terminal is not riding on a transport installed with the moving access point.

In the third aspect, the controller is further configured to execute the first switching process in case that: an access point constituting the wireless LAN is a stationary access point; and a condition for performing the first switching process is satisfied over a first period. The controller is further configured to execute the first switching process in case that: the access point constituting the wireless LAN is a moving access point; and a condition for performing the first switching process is satisfied over a second period longer than the first period.

In the third aspect, the controller is further configured to execute the first switching process in case that: the movement state of the radio terminal is determined as a first state; the access point constituting the wireless LAN is the stationary access point; and the condition for performing the first switching process is satisfied over the first period. The controller is further configured to execute the first switching process in case that: the movement state of the radio terminal is determined as a second state different from the first state; the access point constituting the wireless LAN is the moving access point; and the condition for performing the first switching process is satisfied over the second period.

In the third aspect, the controller prohibits an execution of the first switching process in case that: the movement state of the radio terminal is determined as the second state; and the access point constituting the wireless LAN is the stationary access point.

According to the third aspect, when the access point constituting the wireless LAN is the moving access point, if the condition for performing the first switching process is satisfied over the second period, the controller executes the first switching process. Therefore, it is possible to effectively utilize the moving access point. In addition, the second period is longer than the first period, and thus, it is possible to reduce the possibility that the first switching process is erroneously performed in a case where the radio terminal accidentally moves in a similar way to the moving body installed with the moving access point. An example of such cases includes a case where the transport installed with the moving access point is temporarily stopped, in addition to a case where the user possessing the radio terminal is not riding on the transport installed with the moving access point.

In the second aspect and the third aspect, the second period is N (where N is an integer larger than one) times of the first period, and a value indicating the N is notified from the mobile communication network.

In the second aspect and the third aspect, a value indicating the second period is notified from the mobile communication network.

In the second aspect and the third aspect, the second period is decided beforehand in the mobile communication network.

A radio terminal according to the disclosure comprises a controller configured to perform a second switching process of switching a standby target or a connection target from a wireless LAN to a mobile communication network.

In the fourth aspect, the controller is further configured to execute the second switching process in case that: an access point constituting the wireless LAN is a stationary access point; or a movement state of the radio terminal is determined as a first state; and a condition for performing the second switching process is satisfied over a third period. The controller is further configured to execute the second switching process in case that: the access point constituting the wireless LAN is a moving access point; or the movement state of the radio terminal is determined as a second state different from the first state; and a condition for performing the second switching process is satisfied over a fourth period longer than the third period.

In the fourth aspect, the fourth period is N (where N is an integer larger than one) times of the third period, and a value indicating the N is notified from the mobile communication network.

In the fourth aspect, a value indicating the fourth period is notified from the mobile communication network.

In the fourth aspect, the fourth period is decided beforehand in the mobile communication network.

According to the fourth aspect, when the access point constituting the wireless LAN is the moving access point or when the movement state of the radio terminal is determined as the second state, if a condition for performing the second switching process is satisfied over a fourth period longer than the third period, the controller executes the second switching process. That is, the fourth period is longer than the third period, and thus, in a case where the transport installed with the moving access point is temporarily stopped, a situation is suppressed where the first switching process from the mobile communication network to the wireless LAN is executed along with the start of the transport immediately after the second switching process from the wireless LAN to the mobile communication network is executed along with the temporary stop of the transport. That is, it is possible to effectively utilize the moving access point by suppressing the unnecessary second switching process.

It is noted that in the fourth aspect, as in the first aspect, on the premise that the radio terminal is connected to the moving access point when the movement state of the radio terminal is the second state, a condition that "the access point constituting the wireless LAN is the moving access point" has a similar meaning to a condition that "the movement state of the radio terminal is the second state".

A radio terminal according to an embodiment of the present application is described below by referring to the drawings. In the following description of the drawings, same or similar reference numerals are given to denote same or similar portions.

Note that the drawings are merely schematically shown and proportions of sizes and the like are different from actual ones. Thus, specific sizes and the like should be judged by referring to the description below. In addition, there are of course included portions where relationships or percentages of sizes of the drawings are different with respect to one another.

Embodiment (Communication System)

A communication system according to an embodiment will be described, below. FIG. 1 is a diagram illustrating a communication system 1 according to the embodiment.

As illustrated in FIG. 1, the communication system 1 includes a radio base station 100 and an access point 200. Further, the communication system 1 includes a radio terminal 10 capable of connecting to the radio base station 100 or the access point 200.

The radio terminal 10 is a terminal such as a cell phone or a tablet computer. The radio terminal 10 has a function of performing radio communication with the access point 200, in addition to a function of performing radio communication with the radio base station 100.

The radio base station 100 has a first coverage area 100A, and in the first coverage area 100A, provides a mobile communication service represented by LTE (Long Term Evolution). The radio base station 100 manages one or a plurality of cells, and the first coverage area 100A is configured by one or a plurality of cells. The radio base station 100 is an entity of a mobile communication network. It is noted that a cell may be thought of as a term to indicate a geographical area, and may also be thought of as a function of performing radio communication with the radio terminal 10.

The access point 200 has a second coverage area 200A, and in the second coverage area 200A, provides a wireless LAN service. The access point 200 is an entity of a wireless LAN. At least a part of the second coverage area 200A overlaps the first coverage area 100A. A whole of the second coverage area 200A may overlap the first coverage area 100A. Generally, the second coverage area 200A is smaller than the first coverage area 100A.

In the embodiment, the access point 200 may be a stationary access point installed in a stationary object such as a shop and an office, and may be a moving access point installed in a moving body such as a vehicle. Type information (WLAN Type) indicating whether the access point 200 is a stationary access point or a moving access point is broadcast from the radio base station 100, for example.

(Application Scene)

In the embodiment, a method of performing a switching process (for example, a network selection and a traffic steering) of switching a standby target or a connection target between a mobile communication network and a wireless LAN, will be described. The switching process includes both of: a first switching process of switching a standby target or a connection target from the mobile communication network to the wireless LAN, and a second switching process of switching a standby target or a connection target from the wireless LAN to the mobile communication network. It is noted that in the embodiment, a case where the switching process is the first switching process will be described.

Specifically, in the embodiment, when the movement state of the radio terminal 10 is determined as the first state, if the condition for performing the first switching process is satisfied over the predetermined period, the first switching process is executed. When the movement state of the radio terminal 10 is determined as the second state different from the first state, if the access point 200 constituting the wireless LAN is the moving access point, and further, if the condition for performing the first switching process is satisfied over the predetermined period, the first switching process is executed.

It is noted that in a case where the switching process is the first switching process, the access point 200 constituting the wireless LAN refers to a candidate of the standby target or the connection target in the first switching process.

In the embodiment, the first state refers to a state in which the radio terminal 10 moves slower than a predetermined threshold value. On the other hand, the second state refers to a state in which the radio terminal 10 moves faster than the predetermined threshold value.

The movement state of the radio terminal 10 may be determined on the basis of a change in position acquired from a GPS provided in the radio terminal 10, may be determined on the basis of the acceleration acquired from an acceleration sensor provided in the radio terminal 10, or may be determined on the basis of the number of times of handovers during a constant period.

Alternatively, the mobile communication network may estimate the movement state of the radio terminal 10 and specify, in accordance with the estimated movement state, a predetermined period for determining a period during which the first switching process or the second switching process is satisfied, and then notify the radio terminal 10 of a signal indicating the specified predetermined period. The mobile communication network estimates the movement state of the radio terminal 10 on the basis of the number of times of handovers of the radio terminal 10, for example. In such a case, the radio terminal 10 does not need to directly determine the movement state of the radio terminal 10, and is capable to indirectly determining the movement state of the radio terminal 10 on the basis of the signal notified from the mobile communication network. The specified predetermined period may be included in an RRC message (for example, RRC Connection Reconfiguration) transmitted from the mobile communication network (radio base station 100), or may be included in an SIB (for example, WLAN-OffloadConfig-r12) broadcast from the mobile communication network (radio base station 100), for example.

Alternatively, the mobile communication network may estimate the movement state of the radio terminal 10 and notify the radio terminal 10 of a signal indicating the estimated movement state.

Alternatively, when the user possessing the radio terminal 10 is riding on the transport, the movement state of the radio terminal 10 may be determined on the basis of the speed acquired from a speedometer by performing communication with the speedometer provided in the transport.

In the embodiment, the condition to perform the switching process includes a first condition and a second condition. The first condition is that which should be satisfied by the first information at a mobile communication network side, and the second condition is that which should be satisfied by the second information at a wireless LAN side.

Here, the first information at the mobile communication network side is a measurement result (RSRPmeas) of a signal level of a received signal (RSRP; Reference Signal Received Power) and a measurement result (RSRQmeas) of a signal quality of a received signal (RSRQ; Reference Signal Received Quality), for example.

The second information at the wireless LAN side is a channel utilization value of a wireless LAN (ChannelUtilizationWLAN), a backhaul value of a downlink of a wireless LAN (BackhaulRateDlWLAN), a backhaul value of an uplink of a wireless LAN (BackhaulRateUlWLAN), and a signal level of a received signal (RSSI: Received Signal Strength Indicator), for example.

(First Switching Process from Mobile Communication Network to Wireless LAN)

The first condition that the standby target or the connection target is switched from the mobile communication network to the wireless LAN is that either one of the following condition (1a) or (1b) is satisfied, for example. It is noted that the first condition may be that all of the following conditions (1a) to (1b) are satisfied.

$$\text{RSRPmeas} < \text{Thresh}_{ServingOffloadWLAN, LowP} \quad (1a)$$

$$\text{RSRQmeas} < \text{Thresh}_{ServingOffloadWLAN, LowQ} \quad (1b)$$

It is noted that "$\text{Thresh}_{ServingOffloadWLAN, LowP}$" and "$\text{Thresh}_{ServingOffloadWLAN, LowQ}$" are threshold values provided from the radio base station 100 or previously determined threshold values.

The second condition that the standby target or the connection target is switched from the mobile communication network to the wireless LAN is that all of the following conditions (1c) to (1f) are satisfied, for example. It is noted that the second condition may be that any one of the following conditions (1c) to (1f) is satisfied.

$$\text{ChannelUtilizationWLAN} < \text{Thresh}_{ChUtilWLAN, Low} \quad (1c)$$

$$\text{BackhaulRateDlWLAN} > \text{Thresh}_{BackhRateDLWLAN, High} \quad (1d)$$

$$\text{BackhaulRateUlWLAN} > \text{Thresh}_{BackhRateULWLAN, High} \quad (1e)$$

$$\text{RSSI} > \text{Thresh}_{BEACONSRSSI, High} \quad (1f)$$

It is noted that "$\text{Thresh}_{ChUtilWLAN, Low}$", "$\text{Thresh}_{BackhRateDLWLAN, High}$", "$\text{Thresh}_{BackhRateULWLAN, High}$", and "$\text{Thresh}_{BEACONSRSSI, High}$" are threshold values provided from the radio base station 100 or previously determined threshold values.

(Second Switching Process from Wireless LAN to Mobile Communication Network)

The first condition that the standby target or the connection target is switched from the wireless LAN to the mobile communication network is that the following conditions (2a) and (2b) are satisfied, for example. It is noted that the first condition may be that either one of the following condition (2a) or (2b) is satisfied.

$$\text{RSRPmeas} > \text{Thresh}_{ServingOffloadWLAN, HighP} \quad (2a)$$

$$\text{RSRQmeas} > \text{Thresh}_{ServingOffloadWLAN, HighQ} \quad (2b)$$

It is noted that "$\text{Thresh}_{ServingOffloadWLAN, HighP}$" and "$\text{Thresh}_{ServingOffloadWLAN, HighQ}$" are threshold values provided from the radio base station 100 or previously determined threshold values.

The second condition that the standby target or the connection target is switched from the wireless LAN to the mobile communication network is that any one of the following conditions (2c) to (2f) is satisfied, for example. It is noted that the second condition may be that all of the following conditions (2c) to (2f) are satisfied.

$$ChannelUtilizationWLAN > Thresh_{ChUtilWLAN,\ High} \quad (2c)$$

$$BackhaulRateDlWLAN < Thresh_{BackhRateDLWLAN,\ Low} \quad (2d)$$

$$BackhaulRateUlWLAN < Thresh_{BackhRateULWLAN,\ Low} \quad (2e)$$

$$RSSI < Thresh_{BEACONSRSSI,\ Low} \quad (2f)$$

It is noted that "$Thresh_{ChUtilWLAN,\ High}$", "$Thresh_{BackhRateDLWLAN,\ Low}$", "$Thresh_{BackhRateULWLAN,\ Low}$", and "$Thresh_{BEACONSRSSI,\ Low}$" are threshold values provided from the radio base station 100 or previously determined threshold values.

(Supplementary Description of Switching Process)

When the above-described threshold values are not provided, the radio terminal 10 may omit acquisition (i.e., reception or measurement) of information in which the threshold values are not provided.

In the embodiment, the above-described various types of threshold values are examples of a determination parameter for determining whether or not to perform a switching process of switching a standby target or a connection target between the mobile communication network and the wireless LAN. That is, the determination parameter includes one or more values selected from among "$Thresh_{ServingOffloadWLAN,\ LowP}$", "$Thresh_{ServingOffloadWLAN,\ LowQ}$", "$Thresh_{ChUtilWLAN,\ Low}$", "$Thresh_{BackhRateDLWLAN,\ High}$", "$Thresh_{BackhRateULWLAN,\ High}$", "$Thresh_{BEACONSRSSI,\ High}$", "$Thresh_{ServingOffloadWLAN,\ HighP}$", "$Thresh_{ServingOffloadWLAN,\ HighQ}$", "$Thresh_{ChUtilWLAN,\ High}$", "$Thresh_{BackhRateDLWLAN,\ Low}$", "$Thresh_{BackhRateULWLAN,\ Low}$", and "$Thresh_{BEACONSRSSI,\ Low}$".

Further, the determination parameter includes a predetermined period ($Tsteering_{WLAN}$) in which a state should continue where the first condition or the second condition is satisfied. The predetermined period ($Tsteering_{WLAN}$) is a value of seven seconds at a maximum. Alternatively, the determination parameter may include a predetermined period ($Tsteering_{WLAN}$) referred to in the first switching process from the mobile communication network to the wireless LAN and a predetermined period ($Tsteering_{EUTRA}$) referred to in the second switching process from the wireless LAN to the mobile communication network. That is, in addition to the predetermined period ($Tsteering_{WLAN}$) referred to in the first switching process, a predetermined period ($Tsteering_{EUTRA}$) referred to in the second switching process may be defined.

The determination parameter includes an individual parameter individually notified from the radio base station 100 to the radio terminal 10 and a broadcast parameter broadcast from the radio base station 100 to the radio terminal 10. The individual parameter is included in an RRC message (for example, RRC Connection Reconfiguration) transmitted from the radio base station 100 to the radio terminal 10, for example. The broadcast parameter is included in an SIB (for example, WLAN-OffloadConfig-r12) broadcast from the radio base station 100, for example. It should be noted that when receiving the individual parameter in addition to the broadcast parameter, the radio terminal 10 preferentially applies the individual parameter over the broadcast parameter.

(Radio Terminal)

Figure 2:
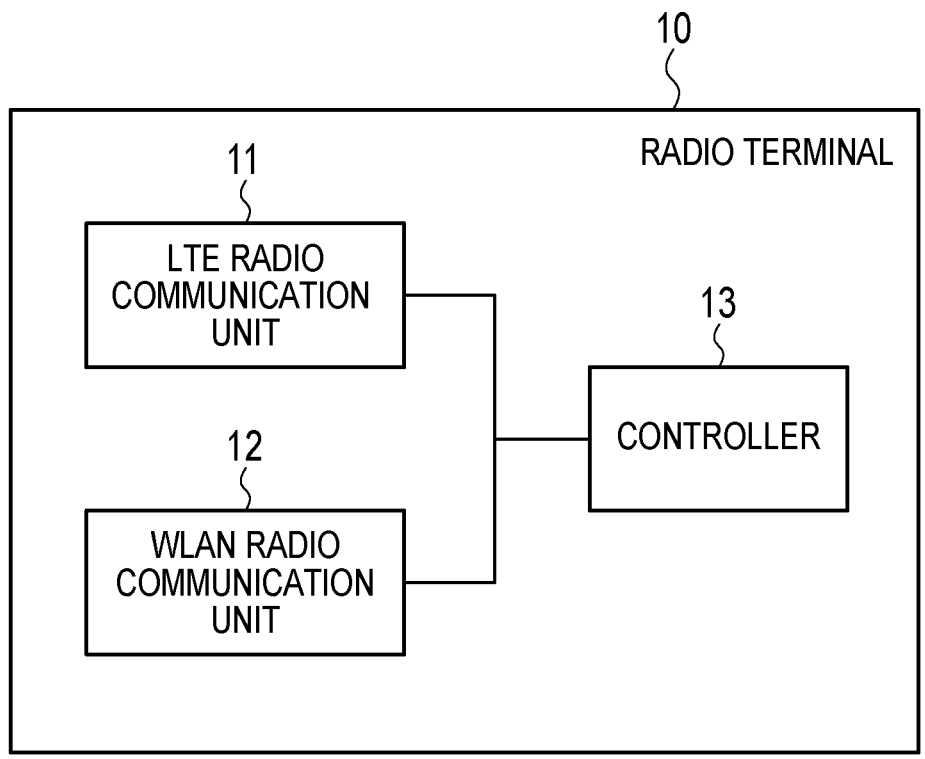
FIG. 2 is a block diagram illustrating a radio terminal 10 according to the embodiment.

A radio terminal according to the embodiment will be described, below. FIG. 2 is a block diagram illustrating the radio terminal 10 according to the embodiment.

As illustrated in FIG. 2, the radio terminal 10 includes an LTE radio communication unit 11, a WLAN radio communication unit 12, and a controller 13.

The LTE radio communication unit 11 has a function of performing radio communication with the radio base station 100. For example, the LTE radio communication unit 11 regularly receives a reference signal from the radio base station 100. The LTE radio communication unit 11 regularly measures a signal level of a reference signal (RSRP) and a signal quality of a reference signal (RSRQ). The LTE radio communication unit 11 receives, as the determination parameter, the individual parameter and the broadcast parameter, from the radio base station 100.

Further, the LTE radio communication unit 11 receives, from the radio base station 100, a list of access points 200 arranged around the radio base station 100. The list of access points 200 is notified by an SIB (WLAN-Id-r12, for example) from the radio base station 100, for example. It is preferable that the list of access points 200 include type information (WLAN Type) indicating whether the access point 200 is a stationary access point or a moving access point.

The WLAN radio communication unit 12 has a function of performing radio communication with the access point 200. For example, the WLAN radio communication unit 12 receives a beacon or probe response from the access point 200. The beacon or the probe response includes a BBS Load information element, and a channel utilization value of the wireless LAN (ChannelUtilizationWLAN) may be acquired from the BBS Load information element.

The WLAN radio communication unit 12 receives, in response to a request (GAS (Generic Advertisement Service) Request) for the access point 200, a response (GAS Response) returned from the access point 200. The response (GAS Response) includes a backhaul value of a downlink of the wireless LAN (BackhaulRateDlWLAN) and a backhaul value of an uplink of the wireless LAN (BackhaulRateUlWLAN). Such an inquiry procedure is performed in accordance with ANQP (Access Network Query Protocol) defined in Hotspot 2.0 of WFA (Wi-Fi Alliance).

The WLAN radio communication unit 12 receives a signal from the access point 200. The WLAN radio communication unit 12 measures a signal level of the received signal (RSSI). The signal level of the received signal (RSSI) is a signal intensity of the beacon or the probe response.

The controller 13 is configured by a CPU, a memory, and the like, and controls the radio terminal 10. For example, the controller 13 is configured to perform, when at least a part of a coverage area of the wireless LAN overlaps a coverage area of the mobile communication network, a switching process (the first switching process and the second switching process) of switching a standby target or a connection destination between the mobile communication network and the wireless LAN. Here, a case where the switching process is the first switching process, will be mainly described.

Specifically, when the movement state of the radio terminal 10 is determined as the first state, if the condition for performing the first switching process is satisfied over the predetermined period, the controller 13 executes the first switching process. When the movement state of the radio terminal 10 is determined as the second state different from the first state, if the access point 200 constituting the wireless LAN is the moving access point, and further, if the condition for performing the first switching process is satisfied over the predetermined period, the controller 13 executes the first switching process.

For example, when the type information (WLAN Type) is broadcast from the radio base station 100, the controller 13 is capable of determining, on the basis of the type information (WLAN Type), whether or not the access point 200 constituting the wireless LAN is the moving access point. It is noted that the controller 13 may determine, on the basis of pre-registration etc. of the access point 200 constituting the wireless LAN, whether or not the access point 200 is the moving access point.

(Radio Base Station)

Figure 3:
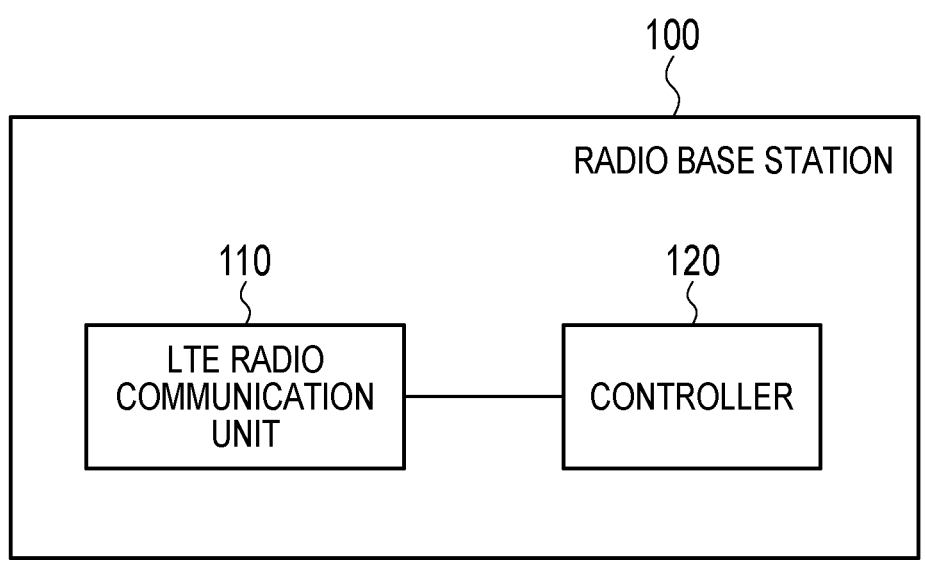
FIG. 3 is a block diagram illustrating a radio base station 100 according to the embodiment.

The radio base station according to the embodiment will be described, below. FIG. 3 is a block diagram illustrating the radio base station 100 according to the embodiment.

As illustrated in FIG. 3, the radio base station 100 includes an LTE radio communication unit 110 and a controller 120.

The LTE radio communication unit 110 has a function of performing radio communication with the radio terminal 10. For example, the LTE radio communication unit 110 regularly transmits a reference signal to the radio terminal 10. The LTE radio communication unit 110 transmits, as the determination parameter, the individual parameter and the broadcast parameter to the radio terminal 10. As described above, the LTE radio communication unit 110 notifies the radio terminal 10, by an RRC message (for example, RRC Connection Reconfiguration), of the individual parameter, and notifies the radio terminal 10, by an SIB (for example, WLAN-OffloadConfig-r12), of the broadcast parameter.

The controller 120 is configured by a CPU, a memory, and the like, and controls the radio base station 100.

(Determination of Switching Process)

Determination of the switching process will be described by using, as an example, the first switching process from the mobile communication network to the wireless LAN, below.

Figure 4:
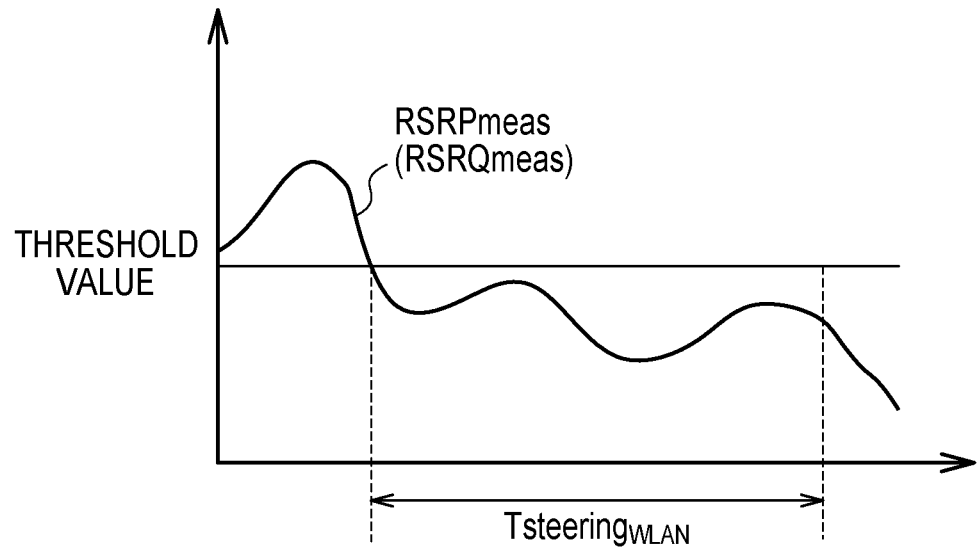
FIG. 4 is a diagram for describing a determination (mobile communication network side) of a switching process according to the embodiment.

Firstly, a method of determining whether or not the first information satisfies the first condition over the predetermined period (Tsteering$_{WLAN}$ or Tsteering$_{EUTRA}$), will be described. The first information is a measurement result (RSRPmeas) of a signal level of a reference signal (RSRP) or a measurement result (RSRQmeas) of a signal quality of a reference signal (RSRQ), the reference signal is received regularly in a short cycle, and the RSRPmeas or the RSRQmeas is measured in a relatively short cycle. That is, as illustrated in FIG. 4, the RSRPmeas or the RSRQmeas is acquired continuously in a time-axis direction.

Figure 5:
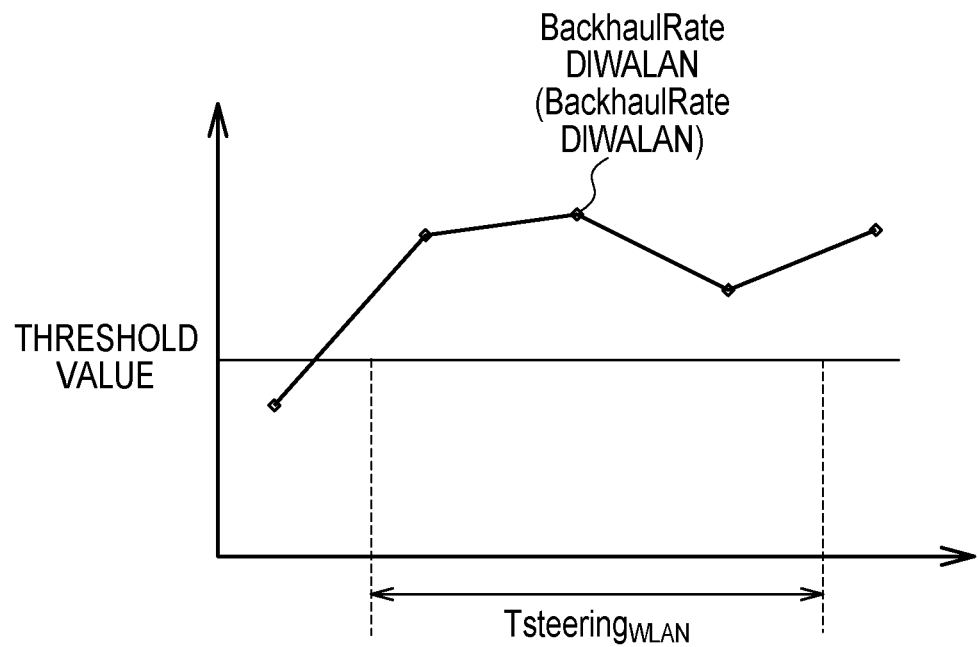
FIG. 5 is a diagram for describing a determination (wireless LAN side) of a switching process according to the embodiment.

Secondly, a method of determining whether or not the second information satisfies the second condition over the predetermined period (Tsteering$_{WLAN}$ or Tsteering$_{EUTRA}$), will be described. There is no fixed rule about a cycle in which the second information is acquired. That is, as illustrated in FIG. 5, the second information (for example, BackhaulRateDlWLAN or BackhaulRateUlWLAN) is acquired discretely in the time-axis direction.

(Communication Method)

Figure 6:
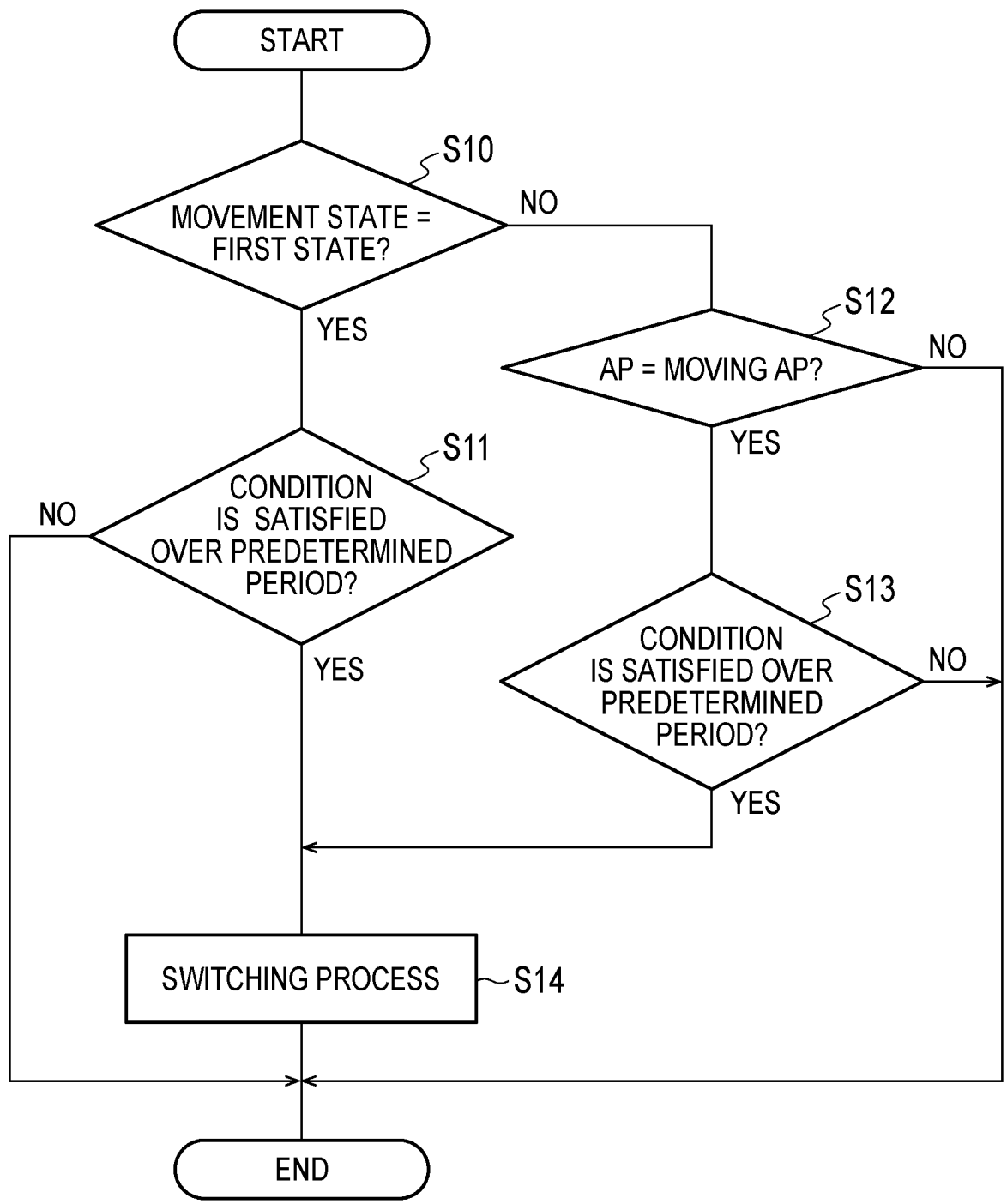
FIG. 6 is a flowchart illustrating a communication method according to the embodiment.

A communication method according to the embodiment will be described below. FIG. 6 is a flowchart illustrating the communication method according to the embodiment. The flow illustrated in FIG. 6 is executed by the radio terminal 10. Here, a case where the switching process is the first switching process, will be described.

As illustrated in FIG. 6, in step S10, the radio terminal 10 determines whether or not the movement state of the radio terminal 10 is the first state. When the determination result is YES, a process of step S11 is performed. When the determination result is NO, a process of step S12 is performed. In other words, when the movement state of the radio terminal 10 is determined as the second state, the process of step S12 is performed.

In step S11, the radio terminal 10 determines whether or not the condition for performing the first switching process is satisfied over the predetermined period. When the determination result is YES, a process of step S14 is performed. When the determination result is NO, a series of processes is ended (that is, the first switching process is not performed).

In step S12, the radio terminal 10 determines whether or not the access point 200 constituting the wireless LAN is the moving access point. When the determination result is YES, a process of step S13 is performed. When the determination result is NO, a series of processes is ended (that is, the first switching process is not performed). In other words, when the movement state of the radio terminal 10 is the second state and the access point 200 constituting the wireless LAN is a stationary access point, a series of processes is ended (that is, the first switching process is not performed).

In step S13, the radio terminal 10 determines whether or not the condition for performing the first switching process is satisfied over the predetermined period. When the determination result is YES, the process of step S14 is performed. When the determination result is NO, a series of processes is ended (that is, the first switching process is not performed).

In step S14, the radio terminal 10 performs the first switching process of switching the standby target or the connection target from the mobile communication network to the wireless LAN.

(Operation and Effect)

According to the embodiment, even when the movement state of the radio terminal 10 is the second state, when the access point 200 constituting the wireless LAN is the moving access point, if the condition for performing the first switching process is satisfied over the predetermined period, the controller 13 of the radio terminal 10 executes the first switching process. Therefore, the first switching process from the mobile communication network to the wireless LAN is not uniformly prohibited in the second state, and thus, it is possible to effectively utilize the moving access point.

[First Modification]

A first modification of the embodiment will be described below. Differences from the embodiment will be mainly described below.

In the embodiment, when the movement state of the radio terminal 10 is determined as the first state, if the condition for performing the first switching process is satisfied over the predetermined period, the controller 13 executes the first switching process. When the movement state of the radio terminal 10 is determined as the second state different from the first state, if the access point 200 constituting the wireless LAN is the moving access point, and further, if the condition for performing the first switching process is satisfied over the predetermined period, the controller 13 executes the first switching process.

On the other hand, in the first modification, when the movement state of the radio terminal 10 is determined as the first state, if the condition for performing the first switching process is satisfied over the first period, the controller 13 executes the first switching process. When the movement state of the radio terminal 10 is determined as the second state different from the first state, if the condition for performing the first switching process is satisfied over the second period longer than the first period, the controller 13 executes the first switching process.

That is, in the first modification, the controller 13 may not need to determine whether or not the access point 200 constituting the wireless LAN is the moving access point. Therefore, the type information (WLAN Type) indicating whether the access point 200 is a stationary access point or a moving access point may not need to be notified to the radio terminal 10. Further, the second period is N (where N is an integer larger than one) times of the first period, and a value indicating N may be notified from the mobile communication network. Alternatively, a value indicating the second period (for example, immediate data indicating the period or an identifier corresponding to the period) may be notified from the mobile communication network. In these cases, the value indicating N or the value indicating the second period may be included in the RRC message (for example, RRC Connection Reconfiguration) or may be included in the SIB (for example, WLAN-OffloadConfig-r12). Alternatively, the second period may be decided beforehand in the mobile communication network.

In the first modification, the first period and the second period are, for example, a type of the predetermined period (Tsteering$_{WLAN}$) mentioned in the first embodiment. The first period may have the same value as the predetermined period (Tsteering$_{WLAN}$) mentioned in the first embodiment.

(Communication Method)

Figure 7:
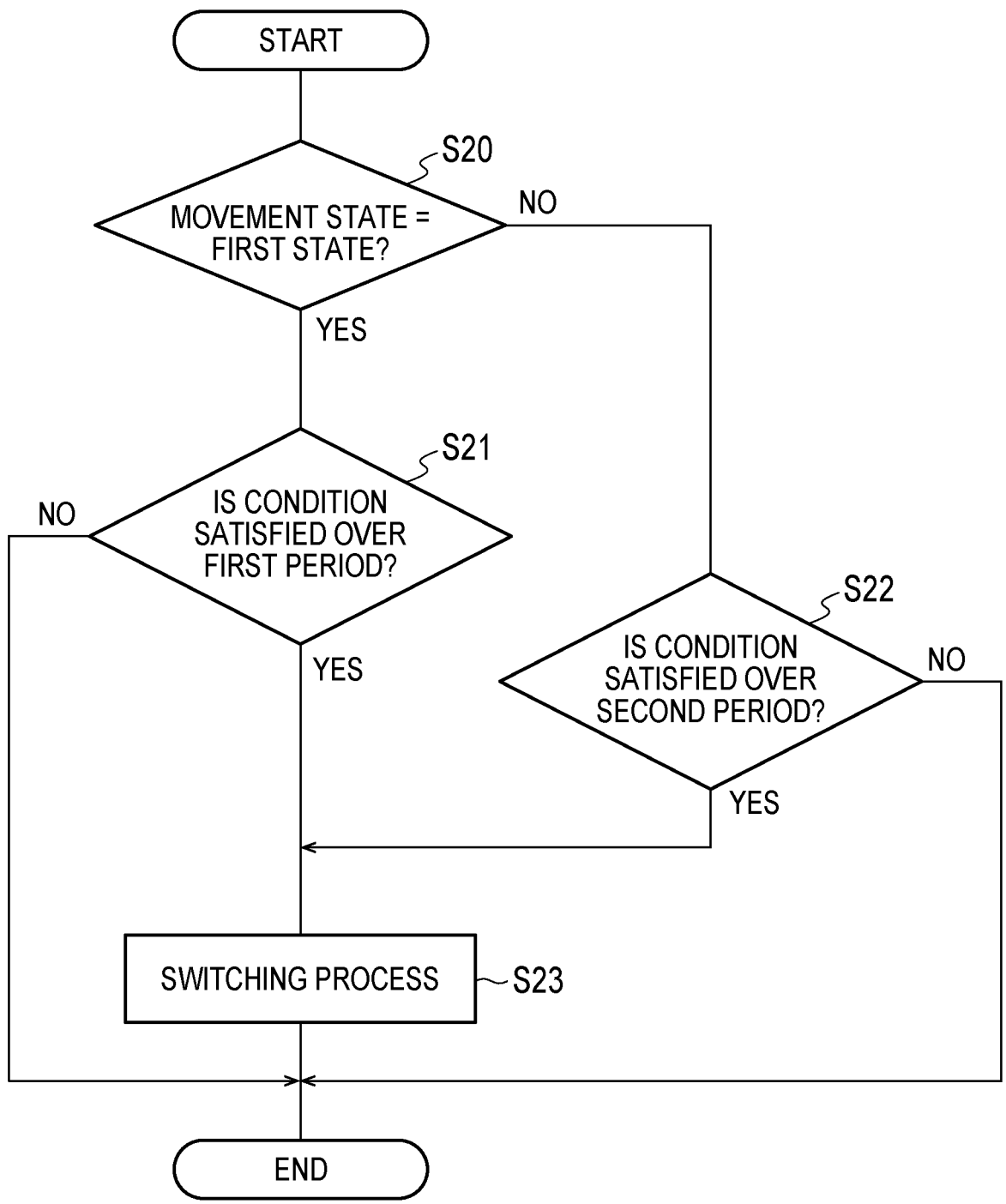
FIG. 7 is a flowchart illustrating a communication method according to a first modification.

A communication method according to the first modification will be described below. FIG. 7 is a flowchart illustrating the communication method according to the first modification. The flow illustrated in FIG. 7 is executed by the radio terminal 10. Here, a case where the switching process is the first switching process, will be described.

As illustrated in FIG. 7, in step S20, the radio terminal 10 determines whether or not the movement state of the radio terminal 10 is the first state. When the determination result is YES, a process of step S21 is performed. When the determination result is NO, a process of step S22 is performed. In other words, when the movement state of the radio terminal 10 is determined as the second state, the process of step S22 is performed.

In step S21, the radio terminal 10 determines whether or not the condition for performing the first switching process is satisfied over the first period. When the determination result is YES, a process of step S23 is performed. When the determination result is NO, a series of processes is ended (that is, the first switching process is not performed).

In step S22, the radio terminal 10 determines whether or not the condition for performing the first switching process is satisfied over the second period. When the determination result is YES, the process of step S23 is performed. When the determination result is NO, a series of processes is ended (that is, the first switching process is not performed).

In step S23, the radio terminal 10 performs the first switching process of switching the standby target or the connection target from the mobile communication network to the wireless LAN.

(Operation and Effect)

According to the first modification, even when the movement state of the radio terminal 10 is the second state, if the condition for performing the first switching process is satisfied over the second period, the controller 13 of the radio terminal 10 executes the first switching process. Therefore, the first switching process from the mobile communication network to the wireless LAN is not uniformly prohibited in the second state, and thus, it is possible to effectively utilize the moving access point. In addition, the second period is longer than the first period, and thus, it is possible to reduce the possibility that the first switching process is erroneously performed in a case where the radio terminal 10 accidentally moves in a similar way to the moving body installed with the moving access point. An example of such cases includes a case where the user possessing the radio terminal 10 is not riding on a transport installed with the moving access point.

[Second Modification]

A second modification of the embodiment will be described below. Differences from the embodiment will be mainly described below.

In the embodiment, when the movement state of the radio terminal 10 is determined as the first state, if the condition for performing the first switching process is satisfied over the predetermined period, the controller 13 executes the first switching process. When the movement state of the radio terminal 10 is determined as the second state different from the first state, if the access point 200 constituting the wireless LAN is the moving access point, and further, if the condition for performing the first switching process is satisfied over the predetermined period, the controller 13 executes the first switching process.

On the other hand, in the second modification, when the access point 200 constituting the wireless LAN is the stationary access point, if the condition for performing the first switching process is satisfied over the first period, the controller 13 executes the first switching process. When the access point 200 constituting the wireless LAN is the moving access point, if the condition for performing the first switching process is satisfied over the second period longer than the first period, the controller 13 executes the first switching process.

That is, in the second modification, the controller 13 may not need to determine the movement state of the radio terminal 10. Further, the second period is N (where N is an integer larger than one) times of the first period, and the value indicating N may be notified from the mobile communication network. Alternatively, the value indicating the second period (for example, the immediate data indicating the period or the identifier corresponding to the period) may be notified from the mobile communication network. In these cases, the value indicating N or the value indicating the second period may be included in the RRC message (for example, RRC Connection Reconfiguration) or may be included in the SIB (for example, WLAN-OffloadConfig-r12). Alternatively, the second period may be decided beforehand in the mobile communication network.

In the second modification, the first period and the second period are, for example, a type of the predetermined period (Tsteering$_{WLAN}$) mentioned in the first embodiment. The first period may have the same value as the predetermined period (Tsteering$_{WLAN}$) mentioned in the first embodiment.

(Communication Method)

Figure 8:
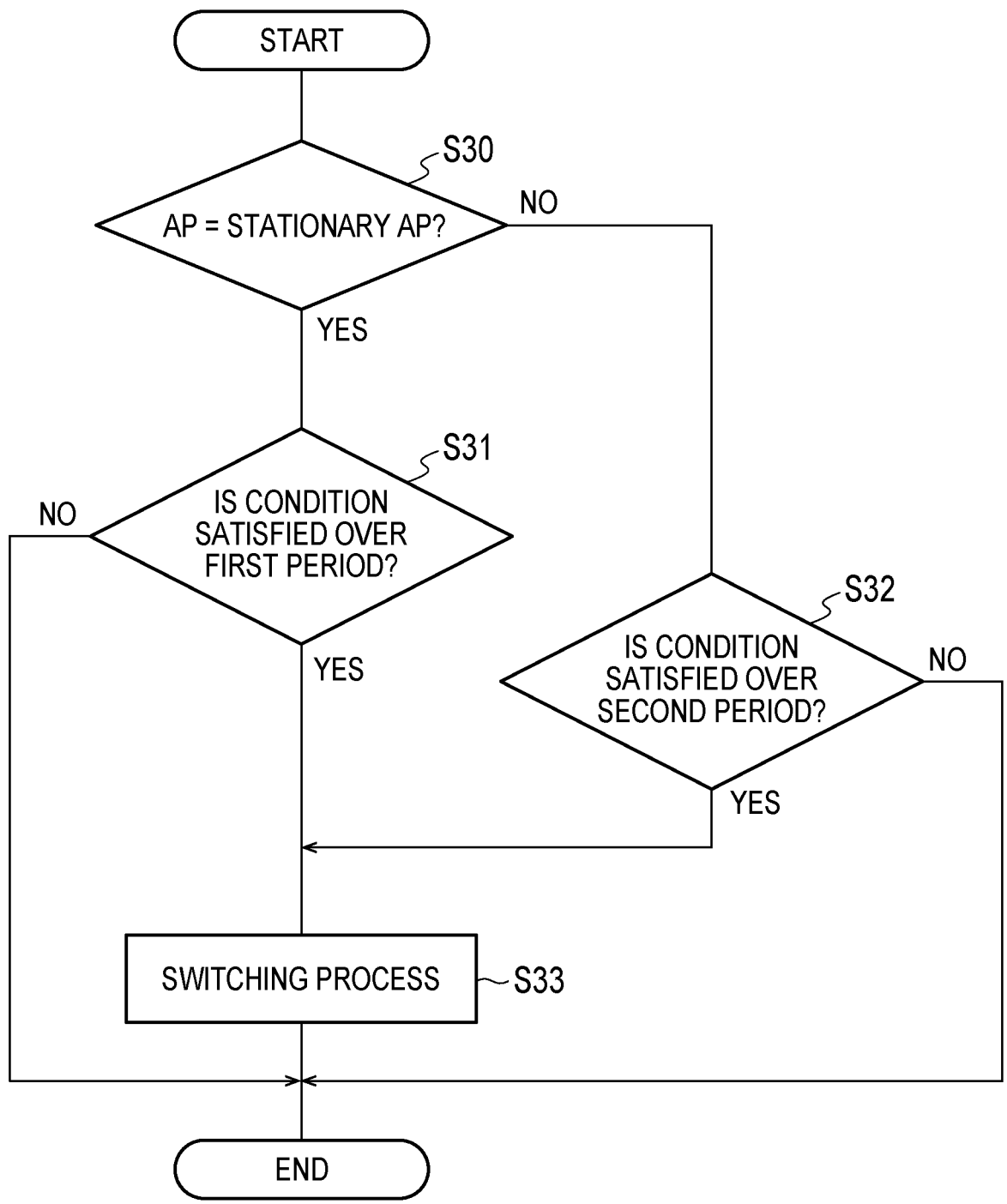
FIG. 8 is a flowchart illustrating a communication method according to a second modification.

A communication method according to the second modification will be described below. FIG. 8 is a flowchart illustrating the communication method according to the second modification. The flow illustrated in FIG. 8 is executed by the radio terminal 10. Here, a case where the switching process is the first switching process, will be described.

As illustrated in FIG. 8, in step S30, the radio terminal 10 determines whether or not the access point 200 constituting the wireless LAN is the stationary access point. When the determination result is YES, a process of step S31 is performed. When the determination result is NO, a process of step S32 is performed. In other words, when the access point 200 constituting the wireless LAN is the moving access point, the process of step S32 is performed.

In step S31, the radio terminal 10 determines whether or not the condition for performing the first switching process is satisfied over the first period. When the determination result is YES, a process of step S33 is performed. When the determination result is NO, a series of processes is ended (that is, the first switching process is not performed).

In step S32, the radio terminal 10 determines whether or not the condition for performing the first switching process is satisfied over the second period. When the determination result is YES, the process of step S33 is performed. When the determination result is NO, a series of processes is ended (that is, the first switching process is not performed).

In step S33, the radio terminal 10 performs the first switching process of switching the standby target or the connection target from the mobile communication network to the wireless LAN.

(Operation and Effect)

According to the second modification, when the access point 200 constituting the wireless LAN is the moving access point, if the condition for performing the first switching process is satisfied over the second period, the controller 13 of the radio terminal 10 executes the first switching process. Therefore, it is possible to effectively utilize the moving access point. In addition, the second period is longer than the first period, and thus, it is possible to reduce the possibility that the first switching process is erroneously performed in a case where the radio terminal accidentally moves in a similar way to the moving body installed with the moving access point. An example of such cases includes a case where the transport installed with the moving access point is temporarily stopped, in addition to a case where the user possessing the radio terminal is not riding on the transport installed with the moving access point.

[Third Modification]

A third modification of the embodiment will be described below. Differences from the first modification will be mainly described below.

In the first modification, the controller 13 does not determine whether or not the access point 200 constituting the wireless LAN is the moving access point. On the other hand, in the third modification, the controller 13 determines whether or not the access point 200 constituting the wireless LAN is the moving access point.

Specifically, in the third modification, when the access point 200 constituting the wireless LAN is the stationary access point, if the movement state of the radio terminal 10 is determined as the first state, and further, if the condition for performing the first switching process is satisfied over the first period, the controller 13 executes the first switching process. When the access point 200 constituting the wireless LAN is the moving access point, if the movement state of the radio terminal is determined as the second state and if the condition for performing the first switching process is satisfied over the second period, the controller 13 executes the first switching process.

Further, when the access point 200 constituting the wireless LAN is the stationary access point, if the movement state of the radio terminal 10 is determined as the second state, the controller 13 prohibits the execution of the first switching process.

(Communication Method)

Figure 9:
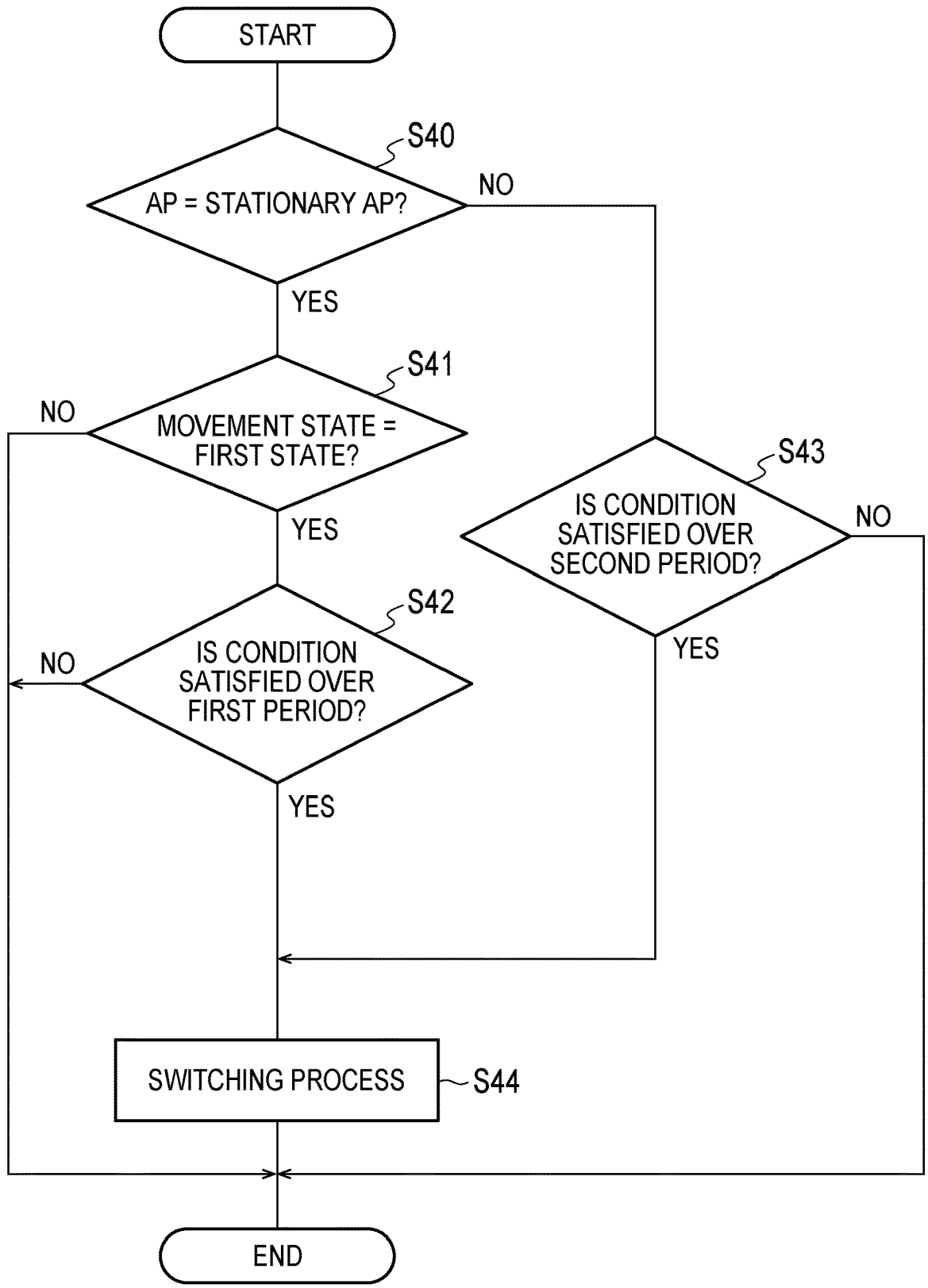
FIG. 9 is a flowchart illustrating a communication method according to a third modification.

A communication method according to the third modification will be described below. FIG. 9 is a flowchart illustrating the communication method according to the third modification. The flow illustrated in FIG. 9 is executed by the radio terminal 10. Here, a case where the switching process is the first switching process, will be described.

As illustrated in FIG. 9, in step S40, the radio terminal 10 determines whether or not the access point 200 constituting the wireless LAN is the stationary access point. When the determination result is YES, a process of step S41 is performed. When the determination result is NO, a process of step S43 is performed. In other words, when the access point 200 constituting the wireless LAN is the moving access point, the process of step S43 is performed.

In step S41, the radio terminal 10 determines whether or not the movement state of the radio terminal 10 is the first state. When the determination result is YES, a process of step S42 is performed. When the determination result is NO, a series of processes is ended (that is, the first switching process is not performed). In other words, when the access point 200 constituting the wireless LAN is the stationary access point, if the movement state of the radio terminal 10 is determined as the second state, the radio terminal 10 prohibits the first switching process.

In step S42, the radio terminal 10 determines whether or not the condition for performing the first switching process is satisfied over the first period. When the determination result is YES, a process of step S44 is performed. When the determination result is NO, a series of processes is ended (that is, the first switching process is not performed).

In step S43, the radio terminal 10 determines whether or not the condition for performing the first switching process is satisfied over the second period. When the determination result is YES, the process of step S44 is performed. When the determination result is NO, a series of processes is ended (that is, the first switching process is not performed).

In step S44, the radio terminal 10 performs the first switching process of switching the standby target or the connection target from the mobile communication network to the wireless LAN.

It is noted that in the third modification, when the access point 200 constituting the wireless LAN is the moving access point, the radio terminal 10 determines whether or not to perform the first switching process without depending on the movement state of the radio terminal 10 but depending on whether or not the condition for performing the first switching process is satisfied over the second period.

(Operation and Effect)

According to the third modification, when the access point 200 constituting the wireless LAN is the stationary access point, if the movement state of the radio terminal 10 is determined as the second state, the controller 13 of the radio terminal 10, the radio terminal 10 prohibits the first switching process. Therefore, while effectively utilizing the moving access point, a situation is suppressed where the second switching process from the wireless LAN to the mobile communication network is executed immediately after the first switching process from the mobile communication network to the wireless LAN is performed.

[Fourth Modification]

A fourth modification of the embodiment will be described below. Differences from the second modification will be mainly described below.

In the second modification, the controller 13 does not determine the movement state of the radio terminal 10. On the other hand, in the fourth modification, the controller 13 determines the movement state of the radio terminal 10.

Specifically, in the fourth modification, when the movement state of the radio terminal 10 is determined as the first state, if the access point 200 constituting the wireless LAN is the stationary access point, and further, if the condition for performing the first switching process is satisfied over the first period, the controller 13 executes the first switching process. When the movement state of the radio terminal 10 is determined as the second state different from the first state, if the access point 200 constituting the wireless LAN is the moving access point, and further, if the condition for performing the first switching process is satisfied over the second period, the controller 13 executes the first switching process.

Further, when the movement state of the radio terminal 10 is determined as the second state, if the access point 200 constituting the wireless LAN is the stationary access point, the controller 13 prohibits the execution of the first switching process.

(Communication Method)

Figure 10:
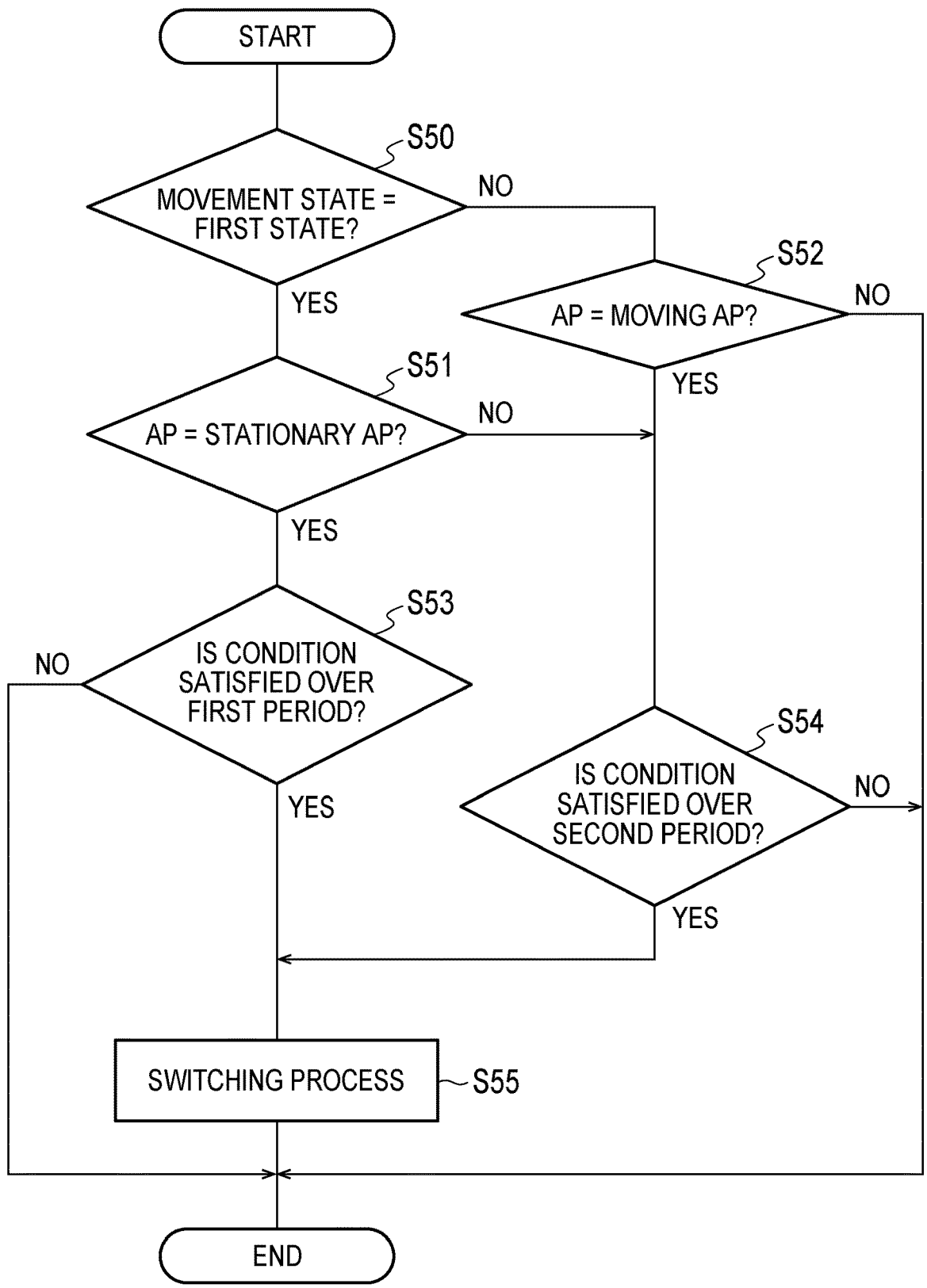
FIG. 10 is a flowchart illustrating a communication method according to a fourth modification.

A communication method according to the fourth modification will be described below. FIG. 10 is a flowchart illustrating the communication method according to the fourth modification. The flow illustrated in FIG. 10 is executed by the radio terminal 10. Here, a case where the switching process is the first switching process, will be described.

As illustrated in FIG. 10, in step S50, the radio terminal 10 determines whether or not the movement state of the radio terminal 10 is the first state. When the determination result is YES, a process of step S51 is performed. When the determination result is NO, a process of step S52 is performed. In other words, when the movement state of the radio terminal 10 is determined as the second state, the process of step S52 is performed.

In step S51, the radio terminal 10 determines whether or not the access point 200 constituting the wireless LAN is the stationary access point. When the determination result is YES, a process of step S53 is performed. When the determination result is NO, a process of step S54 is performed. In other words, when the access point 200 constituting the wireless LAN is the moving access point, the process of step S54 is performed.

In step S52, the radio terminal 10 determines whether or not the access point 200 constituting the wireless LAN is the moving access point. When the determination result is YES, the process of step S54 is performed. When the determination result is NO, a series of processes is ended (that is, the first switching process is not performed). In other words, when the movement state of the radio terminal 10 is determined as the second state, if the access point 200 constituting the wireless LAN is the stationary access point, the radio terminal 10 prohibits the execution of the first switching process.

In step S53, the radio terminal 10 determines whether or not the condition for performing the first switching process is satisfied over the first period. When the determination result is YES, a process of step S55 is performed. When the determination result is NO, a series of processes is ended (that is, the first switching process is not performed).

In step S54, the radio terminal 10 determines whether or not the condition for performing the first switching process is satisfied over the second period. When the determination result is YES, the process of step S55 is performed. When the determination result is NO, a series of processes is ended (that is, the first switching process is not performed).

In step S55, the radio terminal 10 performs the first switching process of switching the standby target or the connection target from the mobile communication network to the wireless LAN.

It is noted that in the fourth modification, when the access point 200 constituting the wireless LAN is the moving access point, the radio terminal 10 determines whether or not to perform the first switching process without depending on the movement state of the radio terminal 10 but depending on whether or not the condition for performing the first switching process is satisfied over the second period.

(Operation and Effect)

According to the fourth modification, when the movement state of the radio terminal 10 is determined as the second state, if the access point 200 constituting the wireless LAN is the stationary access point, the controller 13 of the radio terminal 10 prohibits the execution of the first switching process. Therefore, while effectively utilizing the moving access point, a situation is suppressed where the second switching process from the wireless LAN to the mobile communication network is executed immediately after the first switching process from the mobile communication network to the wireless LAN is performed.

[Fifth Modification]

A fifth modification of the embodiment will be described below. Differences from the first embodiment and the second modification will be mainly described below.

Specifically, in the first embodiment, the case where the switching process is the first switching process is mainly described. Further, in the second modification, when the access point 200 constituting the wireless LAN is the stationary access point, if the condition for performing the first switching process is satisfied over the first period, the controller 13 executes the first switching process. When the access point 200 constituting the wireless LAN is the moving access point, if the condition for performing the first switching process is satisfied over the second period longer than the first period, the controller 13 executes the first switching process.

On the other hand, in the fifth modification, a case where the switching process is the second switching process will be mainly described. When the access point 200 constituting the wireless LAN is the stationary access point, if the condition for performing the second switching process is satisfied over the third period, the controller 13 executes the second switching process. When the access point 200 constituting the wireless LAN is the moving access point, if the condition for performing the second switching process is satisfied over the fourth period longer than the third period, the controller 13 executes the second switching process.

Here, the fourth period is N (where N is an integer larger than one) times of the third period, and a value indicating N may be notified from the mobile communication network. Alternatively, a value indicating the fourth period (for example, immediate data indicating the period or an identifier corresponding to the period) may be notified from the mobile communication network. In these cases, the value indicating N or the value indicating the fourth period may be included in the RRC message (for example, RRC Connection Reconfiguration) or may be included in the SIB (for example, WLAN-OffloadConfig-r12). Alternatively, the fourth period may be decided beforehand in the mobile communication network.

In the fifth modification, the third period and the fourth period referenced in the second switching process are predetermined periods ($Tsteering_{EUTTRA}$) that are defined separately from the first period and the second period referenced in the first switching process. It is noted that, as described above, the first period and the second period are a type of the predetermined period ($Tsteering_{WLAN}$) mentioned in the first embodiment. As described above, for the predetermined period ($Tsteering_{WLAN}$), it is possible to set a value of up to 7 seconds. On the other hand, for the predetermined period ($Tsteering_{EUTTRA}$), it may be possible to set a value of 7 seconds or more.

(Communication Method)

Figure 11:
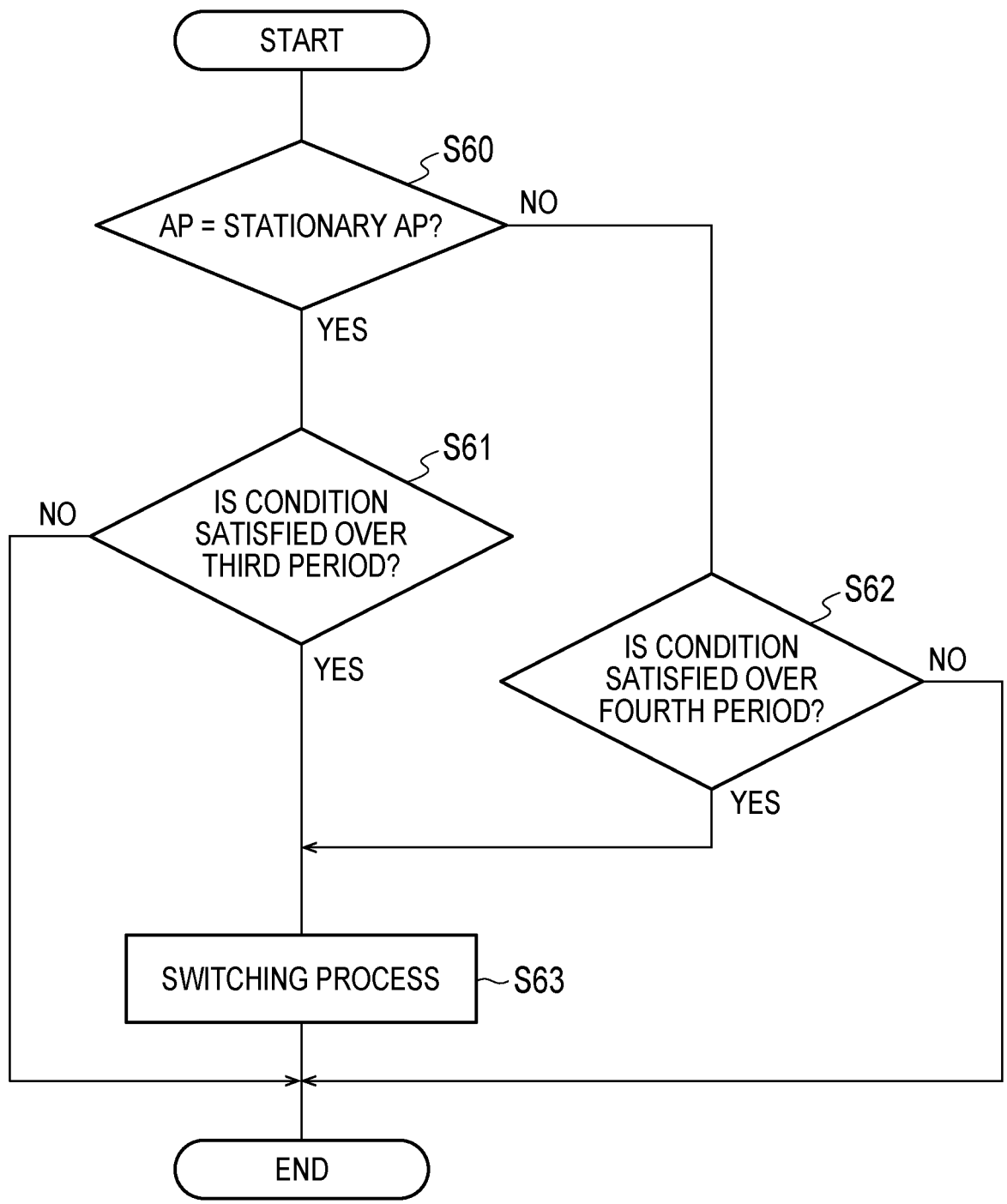
FIG. 11 is a flowchart illustrating a communication method according to a fifth modification.

A communication method according to the fifth modification will be described below. FIG. 11 is a flowchart illustrating the communication method according to the fifth modification. The flow illustrated in FIG. 11 is executed by the radio terminal 10. Here, a case where the switching process is the second switching process, will be described.

As illustrated in FIG. 11, in step S60, the radio terminal 10 determines whether or not the access point 200 constituting the wireless LAN is the stationary access point. When the determination result is YES, a process of step S61 is performed. When the determination result is NO, a process of step S62 is performed. In other words, when the access point 200 constituting the wireless LAN is the moving access point, the process of step S62 is performed.

In step S61, the radio terminal 10 determines whether or not the condition for performing the second switching process is satisfied over the third period. When the determination result is YES, a process of step S63 is performed. When the determination result is NO, a series of processes is ended (that is, the second switching process is not performed).

In step S62, the radio terminal 10 determines whether or not the condition for performing the second switching process is satisfied over the fourth period. When the determination result is YES, the process of step S63 is performed. When the determination result is NO, a series of processes is ended (that is, the second switching process is not performed).

In step S63, the radio terminal 10 performs the second switching process of switching the standby target or the connection target from the mobile communication network to the wireless LAN.

It is noted that in the fifth modification, as in the above-described embodiment, on the premise that the radio terminal 10 is connected to the moving access point when the movement state of the radio terminal 10 is the second state, a condition that "the access point 200 constituting the wireless LAN is the moving access point" has a similar meaning to a condition that "the movement state of the radio terminal 10 is the second state".

Therefore, in the fifth modification, when the movement state of the radio terminal 10 is the second state, if the condition for performing the second switching process is satisfied over the fourth period longer than the third period, the controller 13 may execute the second switching process. Needless to say, in such cases, it is not necessary to determine the access point 200 constituting the wireless LAN.

(Operation and Effect)

According to the fifth modification, when the access point 200 constituting the wireless LAN is the moving access point, if the condition for performing the second switching process is satisfied over the fourth period longer than the third period, the controller 13 of the radio terminal 10 executes the second switching process. That is, the fourth period is longer than the third period, and thus, in a case where the transport installed with the moving access point is temporarily stopped, a situation is suppressed where the first switching process from the mobile communication network to the wireless LAN is executed along with the start of the transport immediately after the second switching process from the wireless LAN to the mobile communication network is executed along with the temporary stop of the transport. That is, it is possible to effectively utilize the moving access point by suppressing the unnecessary second switching process.

Other Embodiments

The present application is described through the above-described embodiments, but it should not be understood that this invention is limited by the statements and the drawings constituting a part of this disclosure. From this disclosure, various alternative embodiments, examples, and operational technologies will be apparent to those skilled in the art.

In the embodiment, as the movement state of the radio terminal 10, two types of movement states (the first state and the second state) are described as an example. However, the movement state of the radio terminal 10 may have three types or more. In such cases, the predetermined period ($Tsteering_{WLAN}$) or the predetermined period ($Tsteering_{EUTRA}$) may be decided for each movement state of the radio terminal 10. It is preferable to set a larger value to the predetermined period ($Tsteering_{WLAN}$) or the predetermined period ($Tsteering_{EUTRA}$) as the moving speed of the radio terminal 10 becomes faster. For example, in the order from slower moving speed, when the movement state of the radio terminal 10 includes a first state, a second state, and a third state, the predetermined period ($Tsteering_{WLAN}$) or the predetermined period ($Tsteering_{EUTRA}$) referenced in the first state may be N1 (where N1 is an integer equal to or larger than one) times of a standard period, the predetermined period ($Tsteering_{WLAN}$) or the predetermined period ($Tsteering_{EUTRA}$) referenced in the second state may be N2 (where N2 is an integer larger than N1) times of the standard period, and the predetermined period ($Tsteering_{WLAN}$) or the predetermined period ($Tsteering_{EUTRA}$) referenced in the third state may be N3 (where N3 is an integer larger than N2) times of the standard period.

The predetermined period ($Tsteering_{EUTRA}$) referenced in the second switching process may be N (where N is an integer larger than one) times of the predetermined period ($Tsteering_{WLAN}$) referenced in the first switching process, and a value indicating N may be notified from the mobile communication network.

In the embodiment, a case where the condition is satisfied over a predetermined period is described, and in such a case, even when there temporarily is a state where the condition is not satisfied during the predetermined period, it is possible to determine that the condition is satisfied over an entire predetermined period.

A program may be provided which causes a computer to execute each process performed by the radio terminal 10 and the radio base station 100. Further, the program may be recorded on a computer-readable medium. When the computer-readable medium is used, it is possible to install the program in a computer. Here, the computer-readable medium recording therein the program may be a non-transitory recording medium. The non-transitory recording medium is not particularly limited; the examples thereof may be a recording medium such as a CD-ROM and a DVD-ROM.

Alternatively, a chip may be provided which is configured by: a memory in which a program for performing each process performed by the radio terminal 10 and the radio base station 100 is stored; and a processor for executing the program stored in the memory.

In the embodiment, the LTE is mentioned as an example of the mobile communication network. However, the embodiment is not limited thereto. As the mobile communication network, a network provided by a communication carrier may suffice. Therefore, the mobile communication network may be UMTS (Universal Mobile Telecommunications System) or may be GSM (registered trademark) (global system for mobile communications).

CROSS REFERENCE

The entire content of Japanese Patent Application No. 2014-232107 (filed on Nov. 14, 2014) is incorporated in the present specification by reference.

INDUSTRIAL APPLICABILITY

The present application is useful in the field of communication.

The invention claimed is:

1. A radio terminal comprising:
a controller configured to perform a first switching process of switching a standby target or a connection target from a cellular network to a wireless local area network (LAN), wherein
the controller is further configured to execute the first switching process in response to a determination that a first condition is satisfied over a first period, which is configured to be set as one of a first amount of time and a second amount of time based on a movement state of the radio terminal, the first condition being a condition in which an Reference Signal Received Power (RSRP) of the cellular network measured by the radio terminal is lower than a first threshold,
the controller is further configured to determine the first amount of time as the first period in response to a determination that the movement state is a first state in which the radio terminal moves slower than a predetermined threshold value,
the controller is further configured to determine the second amount of time as the first period in response to a determination that the movement state is a second state in which the radio terminal moves faster than the predetermined threshold value, the second amount of time being greater than the first amount of time,
the controller is further configured to execute the first switching process in case that:
an access point constituting the wireless LAN is a stationary state;
the movement state of the radio terminal is determined as the first state; and
both of the first condition and a second condition for performing the first switching process are satisfied over the first amount of time, the second condition being a condition in which an Received Signal Strength Indicator (RSSI) of the wireless LAN measured by the radio terminal is greater than a second threshold, and
the controller is further configured to execute the first switching process in case that:
the access point constituting the wireless LAN is a moving state;
the movement state of the radio terminal is determined as the second state; and
both of the first condition and the second condition for performing the first switching process are satisfied over the second amount of time.

2. A radio terminal comprising:
a controller configured to perform a first switching process of switching a standby target or a connection target from a cellular network to a wireless local area network (LAN), wherein
the controller is further configured to execute the first switching process in response to a determination that a first condition is satisfied over a first period, which is configured to be set as one of a first amount of time and a second amount of time based on a state of an access point constituting the wireless LAN, the first condition being a condition in which an Reference Signal Received Power (RSRP) of the cellular network measured by the radio terminal is lower than a first threshold,
the controller is further configured to determine the first amount of time as the first period in response to a determination that the state of the access point constituting the wireless LAN is a stationary state,
the controller is further configured to determine the second amount of time as the first period in response to a determination that the state of the access point constituting the wireless LAN is a moving state, the second amount of time being greater than the first amount of time,
the controller is further configured to execute the first switching process in case that:
a movement state of the radio terminal is determined as a first state in which the radio terminal moves slower than a predetermined threshold value;
the access point constituting the wireless LAN is the stationary state; and
both of the first condition and a second condition for performing the first switching process are satisfied over the first amount of time, the second condition being a condition in which an Received Signal Strength Indicator (RSSI) of the wireless LAN measured by the radio terminal is greater than a second threshold, and
the controller is further configured to execute the first switching process in case that:
the movement state of the radio terminal is determined as a second state in which the radio terminal moves faster than the predetermined threshold value;
the access point constituting the wireless LAN is the moving state; and
both of the first condition and the second condition for performing the first switching process are satisfied over the second amount of time.

3. The radio terminal according to claim 1, wherein
the controller is further configured to prohibit an execution of the first switching process in case that:
the access point constituting the wireless LAN is the stationary state; and
the movement state of the radio terminal is the second state.

4. The radio terminal according to claim 1, wherein
the controller prohibits an execution of the first switching process in case that:
the movement state of the radio terminal is determined as the second state; and
the access point constituting the wireless LAN is the stationary state.

5. The radio terminal according to claim 1, wherein
the second amount of time is N (where N is an integer larger than one) times of the first amount of time, and
a value indicating the N is notified from the cellular network.

6. The radio terminal according to claim 1, wherein
a value indicating the second amount of time is notified from the cellular network.

7. The radio terminal according to claim 1, wherein
the second amount of time is decided beforehand in the cellular network.

8. A radio terminal comprising:
a controller configured to perform a second switching process of switching a standby target or a connection target from a wireless local area network (LAN) to a cellular network, wherein
the controller is further configured to execute the second switching process in response to a determination that a third condition is satisfied over a second period, which is configured to be set as one of a third amount of time and a fourth amount of time based on a movement state of the radio terminal and a state of an access point constituting the wireless LAN, the third condition being a condition in which an Reference Signal Received Power (RSRP) of the cellular network measured by the radio terminal is greater than a first threshold,
the controller is further configured to determine the third amount of time as the second period in response to a determination that the movement state is a first state in which the radio terminal moves slower than a predetermined threshold value, and a determination that the state of the access point constituting the wireless LAN is a stationary state,
the controller is further configured to determine the fourth amount of time as the second period in response to a determination that the movement state is a second state in which the radio terminal moves faster than the predetermined threshold value, and a determination that the state of the access point constituting the wireless LAN is a moving state, and the controller is further configured to execute the second switching process in response to a determination that both of the third condition and a fourth condition are satisfied over the second period, the fourth condition being a condition in which an Received Signal Strength Indicator (RSSI) of the wireless LAN measured by the radio terminal is lower than a second threshold.

9. The radio terminal according to claim 8, wherein
the fourth amount of time is N (where N is an integer larger than one) times of the third period, and
a value indicating the N is notified from the cellular network.

10. The radio terminal according to claim 8, wherein
a value indicating the fourth amount of time is notified from the cellular network.

11. The radio terminal according to claim 8, wherein
the fourth amount of time is decided beforehand in the cellular network.

12. The radio terminal according to claim 2, wherein
the second amount of time is N (where N is an integer larger than one) times of the first amount of time, and
a value indicating the N is notified from the cellular network.

13. The radio terminal according to claim 2, wherein
a value indicating the second amount of time is notified from the cellular network.

14. The radio terminal according to claim 2, wherein
the second amount of time is decided beforehand in the cellular network.

* * * * *